US011553552B2

(12) United States Patent
Tamura et al.

(10) Patent No.: US 11,553,552 B2
(45) Date of Patent: Jan. 10, 2023

(54) COMMUNICATION TERMINAL, CONTROL DEVICE, COMMUNICATION SYSTEM, AND COMMUNICATION METHOD

(71) Applicant: NEC Corporation, Tokyo (JP)

(72) Inventors: Toshiyuki Tamura, Tokyo (JP); Kouji Shimizu, Tokyo (JP); Takahiro Aoki, Tokyo (JP); Hitoshi Naoe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/473,613

(22) PCT Filed: Dec. 28, 2017

(86) PCT No.: PCT/JP2017/047243
§ 371 (c)(1),
(2) Date: Jun. 25, 2019

(87) PCT Pub. No.: WO2018/124278
PCT Pub. Date: Jul. 5, 2018

(65) Prior Publication Data
US 2020/0154509 A1 May 14, 2020

(30) Foreign Application Priority Data
Dec. 28, 2016 (JP) .............................. JP2016-255879

(51) Int. Cl.
H04W 76/28 (2018.01)
H04W 76/11 (2018.01)
(Continued)

(52) U.S. Cl.
CPC ............ *H04W 76/28* (2018.02); *H04W 8/12* (2013.01); *H04W 24/08* (2013.01); *H04W 60/00* (2013.01); *H04W 68/005* (2013.01); *H04W 76/11* (2018.02)

(58) Field of Classification Search
None
See application file for complete search history.

(56) References Cited

U.S. PATENT DOCUMENTS

2016/0183156 A1* 6/2016 Chin ................... H04L 61/2007
370/331
2016/0373915 A1* 12/2016 Kim ....................... H04W 76/14
2018/0152978 A1* 5/2018 Jia .......................... H04W 76/28

FOREIGN PATENT DOCUMENTS

CN 104737603 A 6/2015
WO WO-2015/019465 A1 2/2015
(Continued)

OTHER PUBLICATIONS

Extended European Search Report issued in European Patent Application No. 17885470.9, dated Sep. 25, 2019, 12 pages.
(Continued)

Primary Examiner — Peter Chen
Assistant Examiner — Jeff Banthrongsack

(57) ABSTRACT

To provide a communication terminal that ensures the coincidence of Paging timing between a UE and a control device when an eDRX parameter is updated in a control device, a communication terminal (10) according to the present disclosure includes a receiving unit (11) for receiving a Tracking Area Registration Accept message or a Location Registration Accept message sent from a control device (30), and a sending unit (12) for sending a Tracking Area Registration Complete message or a Location Registration Complete message to the control device (30) when a first eDRX (Extended Idle Mode DRX) parameter is contained in the Tracking Area Registration Accept message or the Location Registration Accept message.

17 Claims, 11 Drawing Sheets

(51) Int. Cl.
*H04W 60/00* (2009.01)
*H04W 68/00* (2009.01)
*H04W 8/12* (2009.01)
*H04W 24/08* (2009.01)

(56) References Cited

FOREIGN PATENT DOCUMENTS

| WO | WO-2016/148752 A1 | 9/2016 | |
|---|---|---|---|
| WO | WO-2016148752 A1 * | 9/2016 | ........ H04W 52/0216 |

OTHER PUBLICATIONS

3GPP TS 23.401 V14.1.0 (Sep. 2016); 3rd Generation Partnership Project; Technical Specification Group Services and System Aspects; General Packet Radio Service (GPRS) enhancements for Evolved Universal Terrestrial Radio Access Network, (E-UTRAN) access (Release 14), 378 pages.
3GPP TS 23.401 V14.2.0 (Dec. 2016); 3rd Generation Partnership Project; Technical Specification Group Services and System Aspects; General Packet Radio Service (GPRS) enhancements for Evolved Universal Terrestrial Radio Access Network (E-UTRAN) access (Release 14), 385 pages.
3GPP TS 23.682 V14.2.0 (Dec. 2016); 3rd Generation Partnership Project; Technical Specification Group Services and System Aspects; Architecture enhancements to facilitate communications with packet data networks and applications (Release 14), 104 pages.
3GPP TS 24.301 V14.2.0 (Dec. 2016); 3rd Generation Partnership Project; Technical Specification Group Core Network and Terminals; Non-Access-Stratum (NAS) protocol for Evolved Packet System (EPS); Stage 3 (Release 14), 470 pages.
3GPP TS 24.008 V14.2.0 (Dec. 2016); 3rd Generation Partnership Project; Technical Specification Group Core Network and Terminals; Mobile radio interface Layer 3 specification; Core network protocols; Stage 3 (Release 14), 765 pages.
NEC, eDRX parameters mismatch between MME and UE, 3GPP TSG CT1 Meeting #100bis C1-170107, Spokane USA; Jan. 9, 2017, 4 pages.
NEC, (Sol A) Extended DRX parameters handling, 3GPP TSG CT1 Meeting #100bis C1-170109, Spokane USA; Jan. 9, 2017, 17 pages.
NEC, (Sol A) Extended DRX parameters handling, 3GPP TSG CT1 Meeting #100bis C1-170111, Spokane USA; Jan. 9, 2017, 20 pages.
NEC, (Sol B) Extended DRX parameters handling, 3GPP TSG CT1 Meeting #100bis C1-170113, Spokane USA; Jan. 9, 2017, 9 pages.
NEC, (Sol B) Extended DRX parameters handling, 3GPP TSG CT1 Meeting #100bis C1-170115, Spokane USA; Jan. 9, 2017, 9 pages.
International Search Report corresponding to PCT/JP2017/047243, dated Feb. 6, 2018, 2 pages.
Chinese Office Action for CN Application No. 201780086513.0 dated Aug. 24, 2021 with English Translation.
Japanese Office Communication for JP Application No. 2016-255879 dated Nov. 16, 2021 with English Translation.
NEC, "Paging with TMSI for eDRX UE", 3GPP TSG CT WG1 #100, C1-164879, Oct. 24, 2016.
Japanese Notice of Reasons for Refusal issued in Japanese Patent Application No. 2016-255879, dated Sep. 29, 2020, 8 pages.

* cited by examiner

COMMUNICATION TERMINAL, CONTROL DEVICE, COMMUNICATION SYSTEM, AND COMMUNICATION METHOD

CROSS-REFERENCE TO RELATED APPLICATIONS

This application is a national stage application of International Application No. PCT/JP2017/047243 entitled "COMMUNICATION TERMINAL, CONTROL DEVICE, COMMUNICATION SYSTEM, AND COMMUNICATION METHOD," filed on Dec. 28, 2017, which claims the benefit of the priority of Japanese Patent Application No. 2016-255879 filed on Dec. 28, 2016, the disclosures of each of which are hereby incorporated by reference in their entirety.

TECHNICAL FIELD

The present disclosure relates to a communication terminal, a control device, a communication system, and a communication method.

BACKGROUND ART

Location registration is specified in 3GPP (3rd Generation Partnership Project), which specifies a standard for mobile networks. The location registration is processing performed for a UE (User Equipment), which is a communication terminal, to notify an MME (Mobility Management Entity), which is a control device, of a change in TA (Tracking Area). One of location registration processing is TAU (Tracking Area Update). For example, details of TAU processing are specified in Chapter 5.3.3.1 of Non Patent Literature 1. In the TAU processing, GUTI (Globally Unique Temporary UE Identity) is used as an identifier of a UE, instead of IMSI (International Mobile Subscriber Identity), which is an identifier specified to a UE. The GUTI is a Temporary ID (Identity) that is delivered in advance from an MME to a UE. The GUTI is preferably changed on a regular basis from the viewpoint of security. The GUTI may be referred to as a temporary identity. Thus, the GUTI is changed in GUTI Reallocation processing (see Chapter 5.3.7 of Non Patent Literature 1), which is performed in parallel with the TAU processing.

An MME sends a TAU Accept message containing a changed GUTI to a UE in the TAU processing and thereby notifies the UE of the changed GUTI. As a response to the TAU Accept message, the UE sends a TAU Complete message to the MME. The MME receives the TAU Complete message and can thereby recognize that the changed GUTI has been notified to the UE.

Packet reception operation specified in 3GPP is described hereinbelow. For example, NW (Network) Triggered Service Request processing is specified in Chapter 5.3.4.3 of Non Patent Literature 1 as a specific example of the packet reception operation. In the NW Triggered Service Request processing, an MME sends a Paging message to an eNB (evolved NodeB), which is a base station. Receiving the Paging message, the eNB executes Paging for the UE. Packet reception is thereby notified to the UE.

The timing of Paging is determined according to DRX (Discontinuous Reception) cycle. Further, there is a case where an IoT (Internet of Things) device is used as the UE. In this case, use of eDRX (Extended Idle Mode DRX) cycle, where the interval of execution of Paging is longer than that of the DRX cycle, is taken into consideration. While the maximum value of the DRX cycle is 2.56 seconds, the maximum value of the eDRX cycle is approximately 43 minutes.

In the case where the eDRX cycle is applied, the eDRX cycle or the timing of Paging is calculated using an eDRX parameter and an S-TMSI (SAE (System Architecture Evolution)-Temporary Mobile Subscriber Identity). The S-TMSI is contained in the GUTI. The eDRX parameter used for calculating the eDRX cycle or the timing of Paging is an eDRX cycle value, for example.

CITATION LIST

Non Patent Literature

NPL1: 3GPP TS23.401 V14.1.0 (September 2016) Chapter 5.3.2, Chapter 5.3.3.1, Chapter 5.3.7

SUMMARY OF INVENTION

Technical Problem

The UE notifies the MME of the timing of Paging by setting the eDRX parameter to a TAU Request message in some cases. On the other hand, the MME updates the eDRX parameter in the TAU processing in some cases due to a reason such as changing the timing of Paging. The MME sets the updated eDRX parameter to a TAU Accept message. The MME sends the TAU Accept message containing the updated eDRX parameter to the UE. However, the MME cannot recognize whether the UE has received the TAU Accept message containing the updated eDRX parameter. For example, even when the UE has not received the TAU Accept message containing the updated eDRX parameter, the MME calculates the timing of Paging by using the updated eDRX parameter. However, because the UE has not received the updated eDRX parameter, the UE determines the timing to monitor Paging Channel by using the eDRX parameter before update. This causes a problem that UE cannot receive Paging.

Further, when an SGSN (Serving GPRS Support Node) is used instead of the MME also, the same problem as when the MME is used occurs. Further, the same problem occurs in a 5G System, or when AMF (Access and Mobility management Function) or another control device is used. The same problem occurs in Attach processing, which is Tracking Area Registration processing disclosed in Chapter 5.3.2 of Non Patent Literature 1, instead of the TAU processing. The Tracking Area Registration is processing for the UE, which is a communication terminal, to notify the MME, which is a control device, of a tracking area in 3GPP. Because the Attach processing is processing performed using the SGSN instead of the MME, or in the 5G System, the same problem occurs.

An object of the present disclosure is to provide a communication terminal, a control device, a communication system, and a communication method that ensure the coincidence of Paging timing between a UE and a control device when an eDRX parameter is updated in a control device such as an MME or an SGSN.

Solution to Problem

A communication terminal according to a first aspect of the present disclosure includes a receiving unit configured to receive a Tracking Area Registration Accept message or a Location Registration Accept message sent from a control device, and a sending unit configured to send a Tracking Area Registration Complete message or a Location Registration Complete message to the control device when a first eDRX parameter is contained in the Tracking Area Registration Accept message or the Location Registration Accept message.

A control device according to a second aspect of the present disclosure includes a sending unit configured to send a Tracking Area Registration Accept message or a Location Registration Accept message containing a first eDRX parameter to a communication terminal, and a receiving unit configured to receive a Tracking Area Registration Complete message or a Location Registration Complete message sent from the communication terminal in response to receipt of the first eDRX parameter by the communication terminal.

A communication system including a receiving unit configured to receive a Tracking Area Registration Accept message or a Location Registration Accept message sent from a control device, and a sending unit configured to send a Tracking Area Registration Complete message or a Location Registration Complete message to the control device when a first eDRX parameter is contained in the Tracking Area Registration Accept message or the Location Registration Accept message, and a control device including a sending unit configured to send the Tracking Area Registration Accept message or the Location Registration Accept message containing the first eDRX parameter to the communication terminal, and a receiving unit configured to receive the Tracking Area Registration Complete message or the Location Registration Complete message sent from the communication terminal in response to receipt of the first eDRX parameter by the communication terminal.

A communication method in a communication terminal according to a fourth aspect of the present disclosure includes receiving a Tracking Area Registration Accept message or a Location Registration Accept message sent from a control device, and sending a Tracking Area Registration Complete message or a Location Registration Complete message to the control device when a first eDRX parameter is contained in the Tracking Area Registration Accept message or the Location Registration Accept message.

A communication method in a control device according to a fifth aspect of the present disclosure includes sending a Tracking Area Registration Accept message or a Location Registration Accept message containing a first eDRX parameter to a communication terminal, and receiving a Tracking Area Registration Complete message or a Location Registration Complete message sent from the communication terminal in response to receipt of the first eDRX parameter by the communication terminal.

Advantageous Effects of Invention

According to the present disclosure, it is possible to provide a communication terminal, a control device, a communication system, and a communication method that ensure the coincidence of Paging timing between a UE and a control device when an eDRX parameter is updated in a control device such as an MME or an SGSN.

DESCRIPTION OF EMBODIMENTS

First Embodiment

Figure 1:
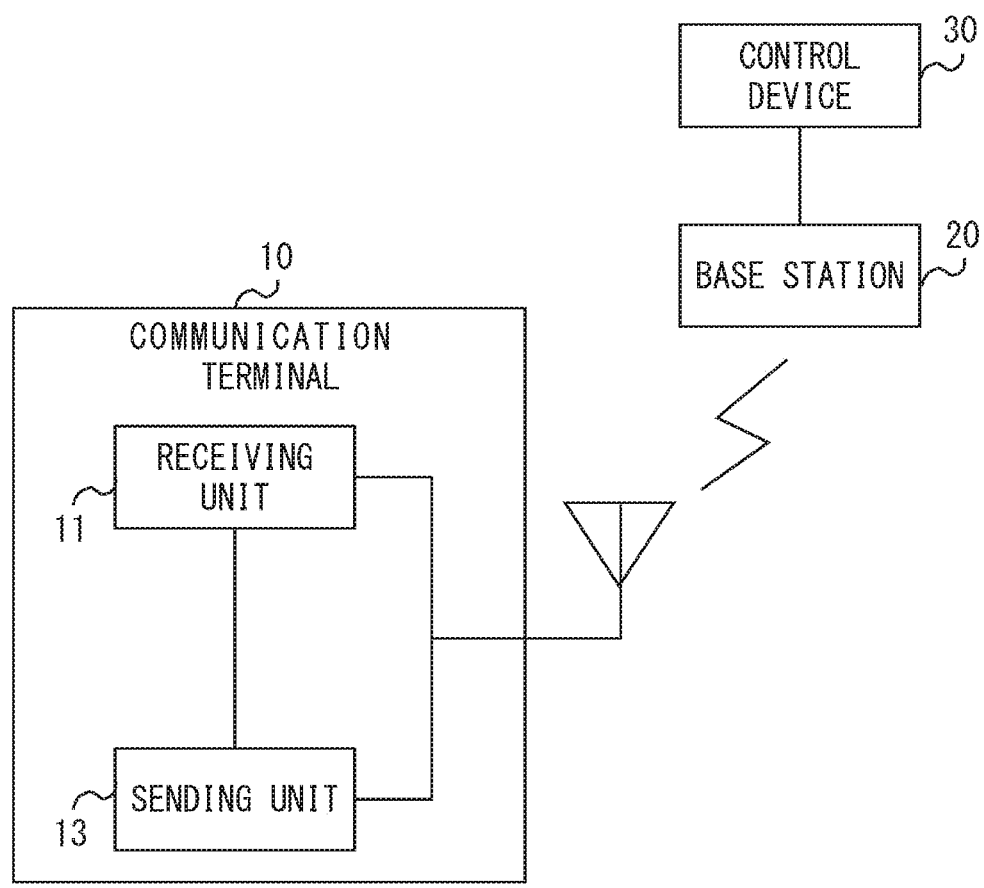
FIG. 1 is a block diagram of a communication system according to a first example embodiment.

Example embodiments of the present disclosure are described hereinafter with reference to the drawings. A configuration example of a communication system according to a first example embodiment is described with reference to FIG. 1. The communication system in FIG. 1 includes a communication terminal 10, a base station 20, and a control device 30. The communication terminal 10, the base station 20, and the control device 30 may be a computer device that operates when a processor executes a program stored in a memory.

The communication terminal 10 may be a cellular phone terminal, a smart phone terminal, a tablet terminal, an IoT terminal, or a personal computer device having a communication function or the like. The communication terminal 30 may be an MME specified in the 3GPP, for example.

A configuration example of the communication terminal 10 is described hereinafter. The communication terminal 10 includes a receiving unit 11 and a sending unit 13. The receiving unit 11 and the sending unit 13 may be software, a module or the like whose processing is executed by running, on a processor, a program stored in a memory. Alternatively, the receiving unit 11 and the sending unit 13 may be hardware such as a circuit or a chip.

The receiving unit 11 receives a Tracking Area Registration Accept message or a Location Registration Accept message sent from the control device 30 through the base station 20. When the communication terminal 10 is performing Attach processing, which is Tracking Area Registration processing, the receiving unit 11 receives an Attach Accept message. When, on the other hand, the communication terminal 10 is performing TAU processing, which is location registration processing, the receiving unit 11 receives an TAU Accept message. The case where the communication terminal 10 is performing TAU processing, which is location registration processing, is described hereinafter as an example. The TAU Accept message is a message indicating that TAU processing related to the communication terminal 10 is completed or TAU processing is accepted in the control device 30 or a core network including the control device 30.

When an eDRX parameter is contained in the TAU Accept message, the sending unit 13 sends a TAU Complete message to the control device 30 through the base station 20. The eDRX parameter includes a paging time window length value and an eDRX cycle value, for example. The eDRX parameter is a parameter that is used for the communication terminal 10 to determine the timing to monitor a Paging Channel according to the eDRX cycle. Further, the eDRX parameter is a parameter for the base station 20 to determine the timing to perform Paging according to the eDRX cycle. The sending unit 13 may send a TAU Complete message to the control device 30 through the base station 20 only when the eDRX parameter is contained in the TAU Accept message.

The control device 30 receives the TAU Complete message sent from the communication terminal 10 and can thereby recognize that the communication terminal 10 has received the eDRX parameter contained in the TAU Accept message.

As described above, when the communication terminal 10 receives the TAU Accept message containing the eDRX parameter, the communication terminal 10 can send the TAU Complete message to the control device 30. The control device 30 can thereby recognize the eDRX parameter which the communication terminal 10 has. Further, the control device 30 can determine the timing of Paging by using the same eDRX parameter as the eDRX parameter which the communication terminal 10 has. As a result, it is possible to allow the timing when the control device 30 performs Paging to coincide with the timing when the communication terminal 10 monitors Paging.

For example, when the control device 30 receives the TAU Complete message, it may determine the timing of Paging by using the eDRX parameter set to the TAU Accept message. On the other hand, when the control device 30 does not receive the TAU Complete message within a certain period of time, it may determine the timing of Paging by using the eDRX parameter before update to the eDRX parameter set to the TAU Accept message.

Further, the operation when the control device 30 is the MME and the control device 30 performs the TAU processing is described in FIG. 1. On the other hand, an operation similar to the TAU processing is performed also in Attach processing (See Chapter 5.3.2 of Non Patent Literature 1) for the communication terminal 10 to make Tracking Area Registration of the control device 30 to an LTE network. In this case, the TAU Accept message is replaced with an Attach Accept message, and the TAU Complete message is replaced with an Attach Complete message. Further, the communication terminal 10 and the control device 30 perform an operation similar to the case of performing the TAU processing also when the control device 30 is an SGSN and the communication terminal 10 performs Attach processing to make Tracking Area Registration to a 3G network or RAU (Routing Area Update) processing, which is one of location registration processing. In the case of the RAU processing, the TAU Accept message is replaced with a RAU Accept message, and the TAU Complete message is replaced with a RAU Complete message.

Second Embodiment

Figure 2:
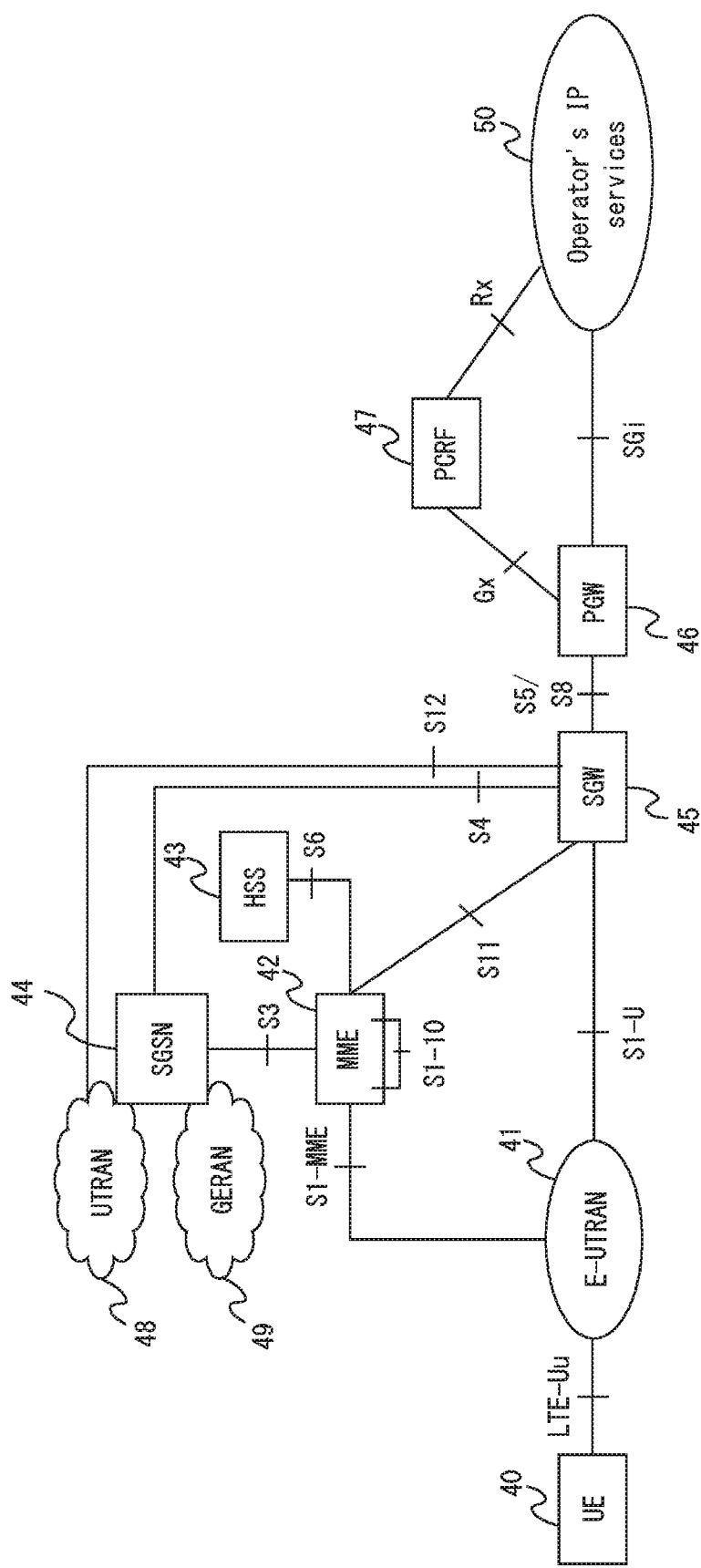
FIG. 2 is a block diagram of a communication system according to a second example embodiment.

A configuration example of a communication system according to a second example embodiment is described with reference to FIG. 2. The communication system in FIG. 2 is a communication system that supports LTE (Long Term Evolution) as a wireless communication scheme, and it includes a communication system that is defined as an EPS (Evolved Packet System) by 3GPP. Note that FIG. 2 is based on TS 23.401 V 13.8.0 FIG. 4.2.1-1.

The communication system of FIG. 2 includes a UE 40, an E-UTRAN (Evolved-Universal Terrestrial Radio Access Network) 41, an MME 42, and an HSS (Home Subscriber Server) 43. The communication system further includes an SGSN 44, an SGW (Serving Gateway) 45, and a PGW (Packet Data Network Gateway) 46. The communication system further includes a PCRF (Policy and Charging Rules Function) entity 47 (which is referred to hereinafter as PCRF 47) and an UTRAN 48. The communication system further includes a GERAN (GSM (registered trademark) (Global System for Mobile communications) EDGE (Enhanced Data Rates for Global Evolution) Radio Access Network) 49 and Operator's IP Services 50.

The MME 42 and the SGSN 44 correspond to the control device 30 in FIG. 1. The UE 40 corresponds to the communication terminal 10 in FIG. 1. In a 5G System or NR (New Radio) also, an AMF (Access and Mobility management Function) or another control device corresponds to the control device 30 in FIG. 1. Further, a base station called 5G-RAN (5G-Radio Access Network) or gNB (next generation NodeB) in the 5G System corresponds to the base station 20 in FIG. 1.

The UE is a general term for communication terminals in 3GPP. The UE may be replaced with an MS (Mobile Station). The E-UTRAN 41 is a RAN that uses LTE as a wireless access system, and it includes an eNB. The UTRAN 48 is a RAN that uses a 3G wireless system as a wireless access system, and it includes an NodeB. The GERAN 49 is a RAN that uses a 2G wireless system as a wireless access system. The 5G-RAN is a RAN that uses an NR as a wireless access system, and it includes a gNB.

The MME 42 band the SGSN 44 are nodes that perform mobility management, session management and the like related to the UE 40. The HSS 43 is a node, which is a subscriber information management device, that manages subscriber information related to the UE 40. The subscriber information may contain information about services to be used by the UE 40. The SGW 45 and the PGW 46 are gateways that relay data transmitted between the UE 40 and the Operator's IP Services 50. The Operator's IP Services 50 may be a server device or a group of server devices managed by a business operator or the like that provides services to the UE 40, for example. The Operator's IP Services 50 may be a server device that provides connection to the Internet. The PCRF 47 is a node that manages a policy, a charging rule and the like.

An LTE-Uu reference point is defined between the UE 40 and the E-UTRAN 41. An S1-MME reference point is defined between the E-UTRAN 41 and the MME 42. An S6 reference point is defined between the MME 42 and the HSS 43. An S3 reference point is defined between the MME 42 and the SGSN 44. An S1-U reference point is defined between the E-UTRAN 41 and the SGW 45. An S11 reference point is defined between the MME 42 and the SGW 45. An S4 reference point is defined between the SGSN 44 and the SGW 45. An S12 reference point is defined between the SGW 45 and the UTRAN 48. An S5/S8 reference point is defined between the SGW 45 and the PGW 46. A Gx reference point is defined between the PGW 46 and the PCRF 47. An SGi reference point is defined between the PGW 46 and the Operator's IP Services 50. An Rx reference point is defined between the PCRF 47 and the Operator's IP Services 50. An S1-10 reference point is defined between the MME 42 and another MME.

Figure 3:
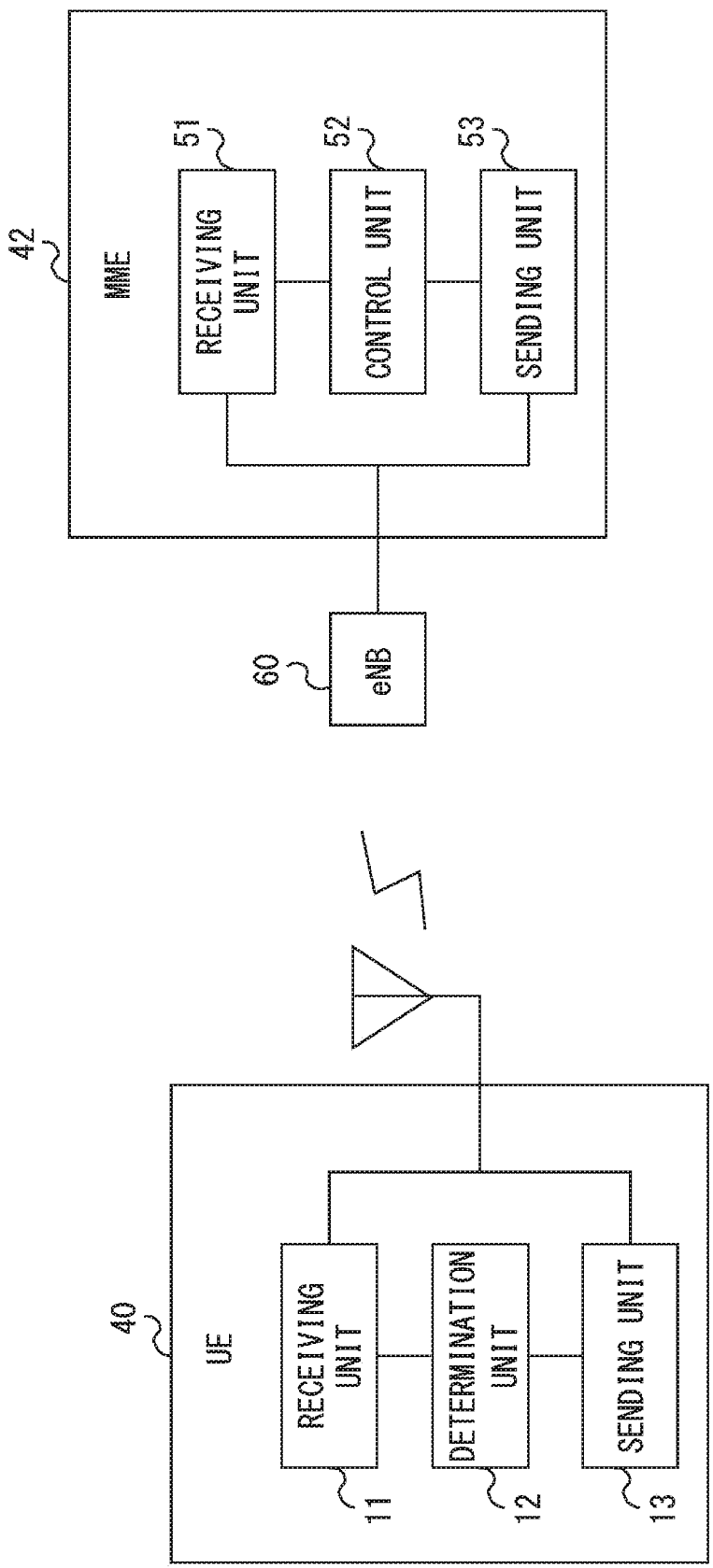
FIG. 3 is a block diagram of an MME and a UE according to the second example embodiment.

Configuration examples of the MME 42 and the UE 40 according to the second example embodiment are described hereinafter reference to FIG. 3. The SGSN 44 has the same configuration as the MME 42 and therefore the detailed description thereof is omitted. An eNB 60 is a base station that is used in the E-UTRAN 41.

The MME 42 includes a receiving unit 51, a control unit 52, and a sending unit 53. The receiving unit 51, the control unit 52 and the sending unit 53 may be software or module whose processing is executed by running, on a processor, a program stored in a memory. Alternatively, the receiving unit 51, the control unit 52 and the sending unit 53 may be hardware such as a circuit or a chip.

The receiving unit 51 receives a TAU Request message containing the eDRX parameter from the UE 40 that requests the TAU processing. The receiving unit 51 outputs the received TAU Request message or the eDRX parameter extracted from the TAU Request message to the control unit 52.

The control unit 52 determines whether or not to update the received eDRX parameter. Updating the received eDRX parameter by the control unit 52 may be rephrased as changing the eDRX parameter. When the control unit 52 determines to update the received eDRX parameter, the control unit 52 performs update processing of the eDRX parameter. The eDRX parameter update processing is, to be more precise, processing that updates the paging time window length value and the eDRX cycle value. The eDRX parameter updated in the eDRX parameter update processing may be a different value from the eDRX parameter contained in the TAU Request message.

For example, the control unit 52 may determine to update the eDRX parameter each time the TAU Request message containing the eDRX parameter is sent from the UE 40. Alternatively, the control unit 52 may determine to update the eDRX parameter when a specified period of time has elapsed from the previous update of the eDRX parameter related to the UE 40. Alternatively, the control unit 52 may determine to update the eDRX parameter when the eDRX parameter related to the UE 40 acquired from the HSS 43 is different from the eDRX parameter contained in the TAU Request message. For example, the control unit 52 may determine to update the eDRX parameter contained in the TAU Request message to the eDRX parameter acquired from the HSS 43. Alternatively, the control unit 52 may update the eDRX parameter to a value previously determined by the MME 42 in accordance with an operator policy.

The control unit 52 outputs the updated eDRX parameter or the eDRX parameter received from the receiving unit 51 to the sending unit 53. The case where the control unit 52 outputs the eDRX parameter received from the receiving unit 51 to the sending unit 53 is the case of not updating the eDRX parameter contained in the TAU Request message, for example.

The sending unit 53 sends the TAU Accept message to which the eDRX parameter output from the control unit 52 is set to the UE 40 through the eNB 60. When the UE 40 receives the TAU Accept message containing the eDRX parameter, it sends the TAU Complete message back to the MME 42. Specifically, it is assumed that, when the TAU Accept message to which the eDRX parameter is set is sent from the sending unit 53, the MME 42 receives the TAU Complete message in the receiving unit 51 in normal cases. However, there is a case where the sending unit 53 sends the TAU Accept message to which the eDRX parameter is set, and the receiving unit 51 does not receive the TAU Complete message within a certain period of time. In this case, the MME 42 determines that the UE 40 does not receive the TAU Accept message normally.

When the receiving unit 51 does not receive the TAU Complete message within a certain period of time, the MME 42 resends a Paging message at the timing of Paging calculated using the eDRX parameter set to the TAU Accept message. When the receiving unit 51 does not receive the TAU Complete message within a certain period of time, the MME 42 may send a Paging message at the timing of Paging calculated using the eDRX parameter set to the TAU Request message, for example. Alternatively, assume a case where the receiving unit 51 does not receive the TAU Complete message within a certain period of time and there is a value negotiated with the UE 42 before receiving the TAU Request message. In this case, the MME 42 may send a Paging message at the timing of Paging calculated using that value. Specifically, when the receiving unit 51 does not receive the TAU Complete message within a certain period of time, the MME 42 may calculate the timing of Paging by using the eDRX parameter before update even if the eDRX parameter is updated. Alternatively, there can be a situation where, even if the UE 40 sends the TAU Complete message, the TAU Complete does not reach the MME 42 due to a certain cause such as a failure in a radio period. There is a case where there are the timing of Paging calculated using the eDRX parameter set to the TAU Accept message and a value negotiated with the UE 40 before receiving the TAU Request message. In such a case, the MME 42 may send a Paging message at each of the timing of Paging calculated using that value. Further, when the eDRX parameter is set to the TAU Request message, a Paging message may be sent at the timing of Paging calculated using that value. When the MME 42 sends a Paging message by using a plurality of eDRX parameters, it may calculate the timing of Paging from each of the eDRX parameters and send a Paging message from the earliest to the latest. Further, when there is a response to a Paging message from the UE 40, the Paging processing may be stopped since there is no need to send a Paging message at all of the timing calculated from the eDRX parameters.

Figure 4:
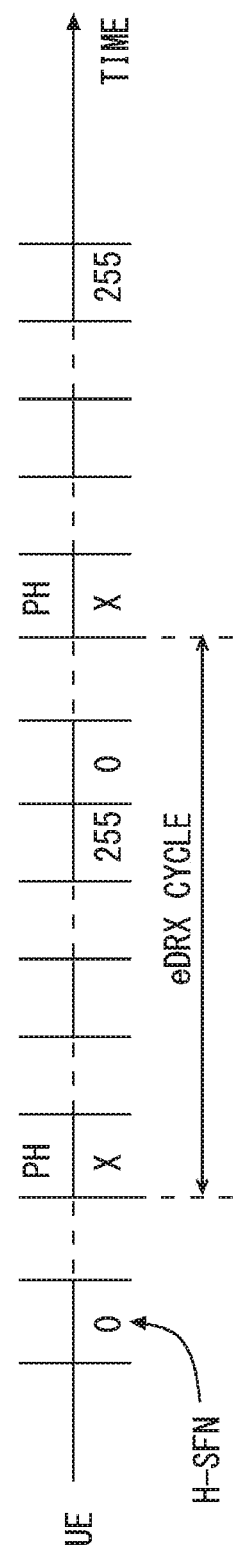
FIG. 4 is a view illustrating the timing of Paging in the case where an eDRX cycle is applied according to the second example embodiment.

The timing of Paging in the case where the eDRX cycle is applied is described hereinafter with reference to FIG. 4. In FIG. 4, the horizontal axis indicates the time axis. The time axis is indicated using H-SFN (Hyper-System Frame Number). As the H-SFN, 256 frames from 0 to 255 are defined, and values from 0 to 255 are used repeatedly. The length of 1H-SFN is defined as 10.24 seconds. Thus, the time from H-SFN #0 to H-SFN #255 is about 43 minutes. In FIG. 4, the length of 256H-SFN is defined as the eDRX cycle. X indicates any value of H-SFN. Although FIG. 4 shows an example in which the number of frames is 256, the number of frames is not limited to 256. For example, the maximum number of frames may be enlarged to 1024, and any number of frames equal to or smaller than the maximum number of frames may be used.

PH (Paging Hyperframe) is H-SFN at the timing when the UE 40 monitors Paging. FIG. 4 shows that the UE 40 monitors Paging at the timing of H-SFN #X. H-SFN #X indicates X-th H-SFN. PH is calculated based on the S-TMSI and the eDRX cycle value. The H-SFN shown in FIG. 4 is synchronized with the eNB included in the E-UTRAN 41 and the MME 42. Thus, the eNB and the MME 42 also calculate PH by using the S-TMSI and the eDRX cycle value. Therefore, PH is, in other words, the timing when the eNB performs Paging.

Referring back to FIG. 3, a configuration example of the UE 40 is described. The UE 40 has a configuration where a determination unit 12 is added to the communication terminal 10 shown in FIG. 1. The detailed description of the receiving unit 11 and the sending unit 13 is omitted.

The determination unit 12 receives the TAU Accept message output from the receiving unit 11. The determination unit 12 determines whether the eDRX parameter is contained in the TAU Accept message received from the receiving unit 11. After that, the determination unit 12 outputs, to the sending unit 13, a determination result of determining whether the eDRX parameter is contained in the TAU Accept message.

Figure 5:
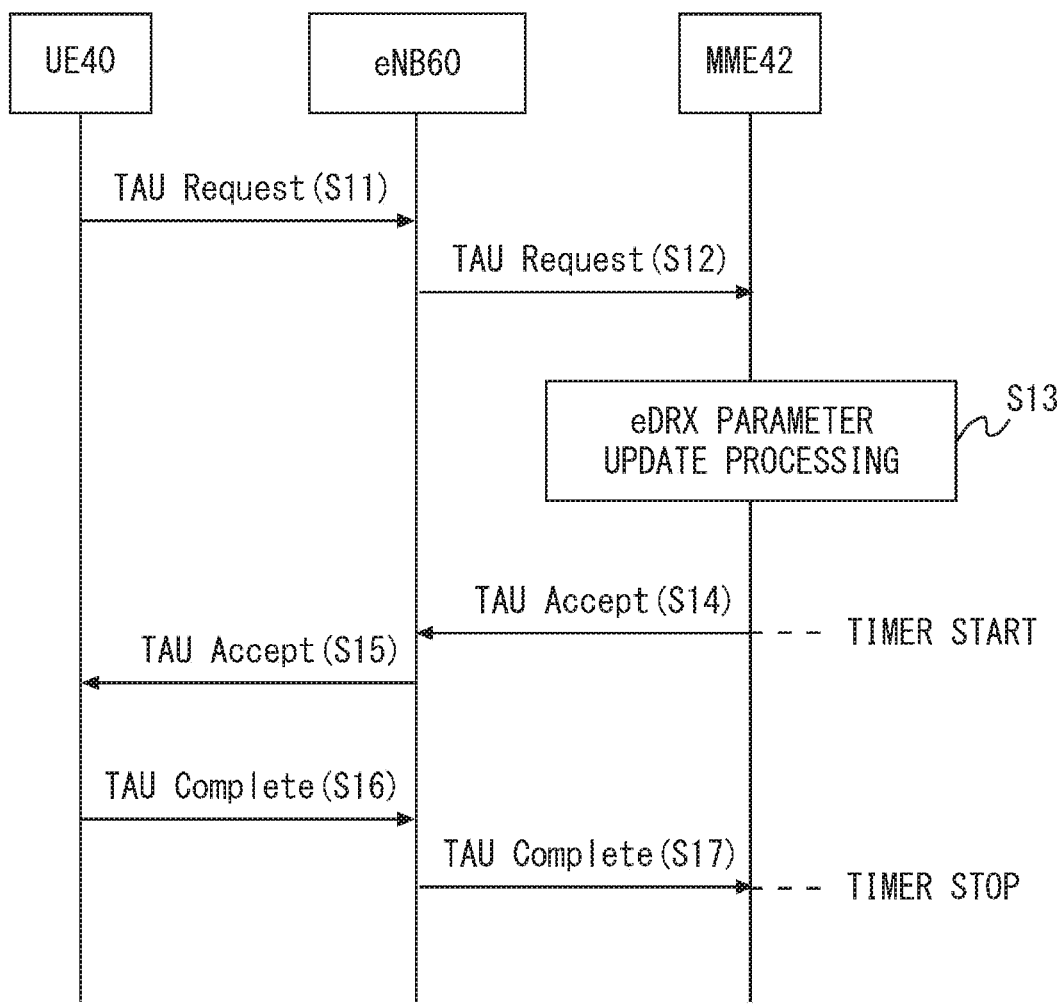
FIG. 5 is a view showing the flow of TAU processing according to the second example embodiment.

The flow of TAU processing according to the second example embodiment is described hereinafter with reference to FIG. 5. First, the UE 40 sends the TAU Request message to the eNB 60 (S11). The UE 40 is a terminal that monitors Paging with the eDRX parameter and the value calculated using the S-TMSI contained in the GUTI. As the GUTI, the one notified from the MME 42 to the UE 40 in Attach processing when the UE 40 is initially moved into the area of the MME 42, TAU processing performed last time, or GUTI Reallocation processing occurred alone may be used. As the eDRX parameter, the one determined by the UE 40 may be used, for example. In this case, the TAU Request message sent from the UE 40 to the eNB 60 contains the eDRX parameter. After that, the eNB 60 transfers the TAU Request message received from the UE 40 to the MME 42 (S12).

When the MME 42 receives the TAU Request message containing the eDRX parameter, it may update the eDRX parameter contained in the TAU Request message (S13). It is assumed in this example that the the MME 42 updates eDRX parameter each time the TAU Request message containing the eDRX parameter is sent from the UE 40. The MME 42 may determine the updated eDRX parameter according to the operator policy in its own device, or may acquire the updated eDRX parameter from the HSS 43. In other words, calculation of the updated eDRX parameter may be performed in the MME 42 or may be performed in the HSS 43.

Next, the MME 42 sends, to the eNB 60, the TAU Accept message to which the updated eDRX parameter is set (S14). At this time, the MME 42 starts a timer to monitor the receipt of the TAU Complete message within a predetermined period of time. This timer may be T3450.

Then, the eNB 60 transfers the TAU Accept message received from the MME 42 to the UE 40 (S15). Receiving the TAU Accept message containing the eDRX parameter, the UE 40 sends the TAU Complete message to the eNB 60 (S16). Then, the eNB 60 transfers the TAU Complete message received from the UE 40 to the MME 42 (S17). Upon receipt of the TAU Complete message in Step S17, the MME 42 stops the timer started when the TAU Accept message is sent to the eNB 60. When the timer expires before receiving the TAU Complete message in Step S17, the MME 42 resends, to the eNB 60, the TAU Accept message to which the updated eDRX parameter is set.

The TAU processing performed between Step S12 and Step S14 is the same as the existing TAU processing and the detailed description thereof is omitted.

Even when the processing of updating the eDRX parameter in Step S13 is not performed, the MME 42 may send, to the eNB 60, the TAU Accept message to which the eDRX parameter contained in the TAU Request message is set. When the MME 42 sends the TAU Accept message to which the eDRX parameter contained in the TAU Request message is set to the eNB 60, the MME 42 may recognize that the TAU Complete message is not to be sent. Thus, when the UE 40 receives the TAU Accept message containing the same eDRX parameter as the eDRX parameter set to the TAU Request, the UE 40 may determine not to send the TAU Complete message. In other words, the UE 40 may refrain from sending the TAU Complete message when it receives the TAU Accept message containing the same eDRX parameter as the eDRX parameter set to the TAU Request. Further, in other words, the UE 40 may send the TAU Complete message only when it receives the TAU Accept message containing a different eDRX parameter from the eDRX parameter set to the TAU Request. Further, the MME 42 does not need to wait to receive the TAU Complete message when it sends the TAU Accept message to which the eDRX parameter contained in the TAU Request message is set to the eNB 60.

Further, the MME 42 may determine whether a specified period of time has elapsed from the previous update of the eDRX parameter related to the UE 40 in Step S12, and perform the processing of Step S13 when the specified period of time has elapsed. Alternatively, the MME 42 may acquire the eDRX parameter related to the UE 40 from the HSS 43 when the eDRX parameter is contained in the TAU Accept message. The MME 42 may perform the processing of Step S13 when the eDRX parameter related to the UE 40 acquired from the HSS 43 is different from the eDRX parameter contained in the TAU Request message.

The flow of sending the TAU Complete message in the UE 40 according to the second example embodiment is described hereinafter with reference to FIG. 6. First, the receiving unit 11 receives the TAU Accept message sent from the MME 42 through the eNB 60 (S21). Next, the determination unit 12 determines whether the eDRX parameter is contained in the received TAU Accept message (S22). When the determination unit 12 determines that the eDRX parameter is not contained in Step S22, the determination unit 12 then determines whether the changed GUTI is contained in the received TAU Accept message (S23). When the determination unit 12 determines that the changed GUTI is contained in Step S23, the sending unit 13 sends the TAU Complete message to the MME 42 through the eNB 60 (S24). At this time, the determination unit 12 may determine whether the TMSI is contained instead of the GUTI, or may determine whether the GUTI and the TMSI are contained.

When the determination unit 12 determines that the eDRX parameter is contained in the received TAU Accept message in Step S22, the process proceeds to Step S24. At this time, the sending unit 13 sends the TAU Complete message to the MME 42 through the eNB 60. Thus, when the eDRX parameter is contained in the TAU Accept message, UE 40 sends the TAU Complete message to the MME 42 regardless of whether the changed GUTI is contained in the TAU Accept message or not. In other words, even when the changed GUTI is not contained in the TAU Accept message, the UE 40 sends the TAU Complete message to the MME 42 if the eDRX parameter is contained. Further, in Step S22, the determination unit 12 may determine whether the eDRX parameter contained in the received TAU Accept message is the same as the eDRX parameter set to the TAU Request message (S11).

When the determination unit 12 determines that the changed GUTI is not contained in the received TAU Accept message in Step S23, the process ends.

As described above, the UE 40 according to the second example embodiment can send the TAU Complete message to the MME 42 when it receives the TAU Accept message containing the eDRX parameter. In other words, the MME 42 can receive the TAU Complete message as a response message when it sends, to the UE 40, the TAU Accept message to which the eDRX parameter is set.

The MME 42 can thereby determine the timing to perform Paging by using the same eDRX parameter as the eDRX parameter which the UE 40 has. It is thereby possible to allow the timing when the MME 42 performs Paging to coincide with the timing when the UE 40 monitors Paging.

Further, although the UE 40 sends the TAU Complete message to the MME 42 in the description of the second example embodiment, another message indicating the receipt of the eDRX parameter may be used.

Figure 6:
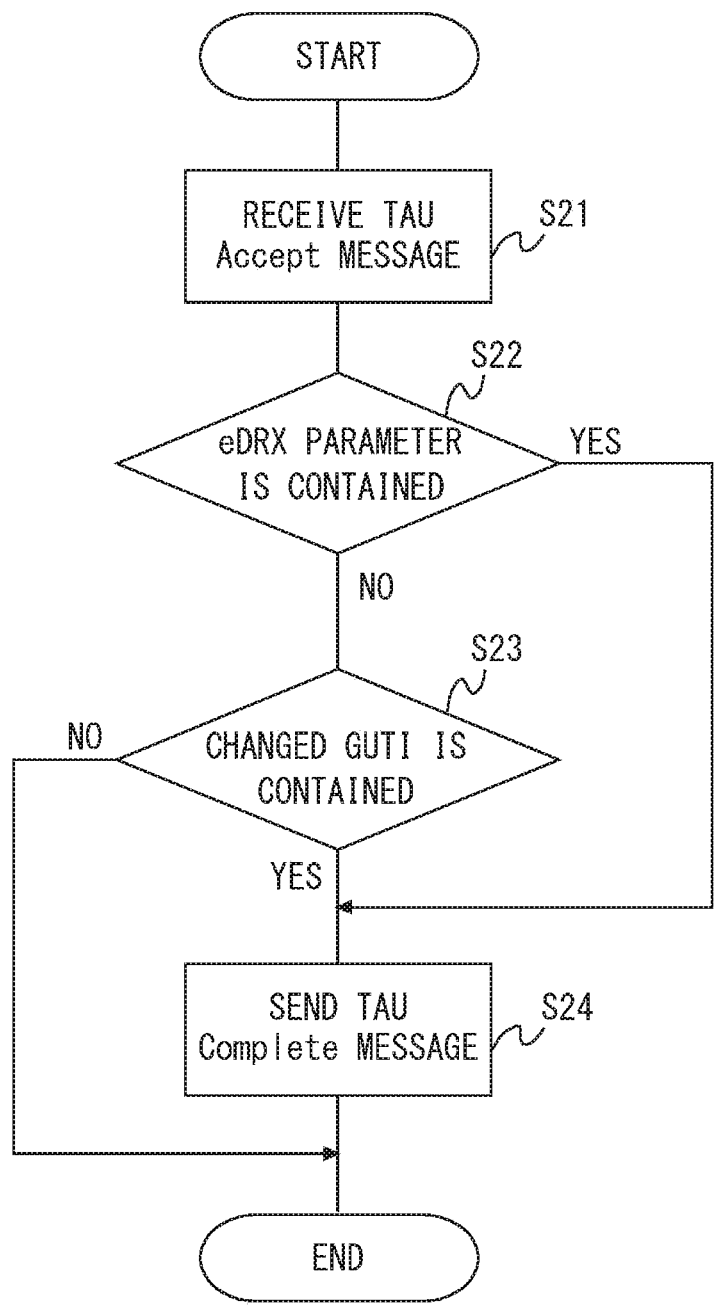
FIG. 6 is a view showing the flow of sending a TAU Complete message in an UE according to the second example embodiment.

Further, in Step S22 of FIG. 6, the determination unit 12 may determine whether the updated eDRX parameter is contained. The process may proceed to Step S24 when the determination unit 12 determines that the updated eDRX parameter is contained in Step S22 of FIG. 6, and may proceed to Step S23 when the determination unit 12 determines that the updated eDRX parameter is not contained.

Further, although the TAU processing performed in the MME 42 is described in the second example embodiment, the Attach processing may be performed instead of the TAU processing. In this case, the TAU Request message is replaced with an Attach Request message. The TAU Accept message is replaced with an Attach Accept message. The TAU Complete message is replaced with an Attach Complete message. Alternatively, the SGSN 44 may be used instead of the MME 42, and RAU processing may be performed instead of the Attach processing to make Tracking Area Registration to a 3G network or the TAU processing. In the case of the RAU processing, the TAU Request message is replaced with a RAU Request message. The TAU Accept message is replaced with a RAU Accept message. The TAU Complete message is replaced with a RAU Complete message.

Figure 7:
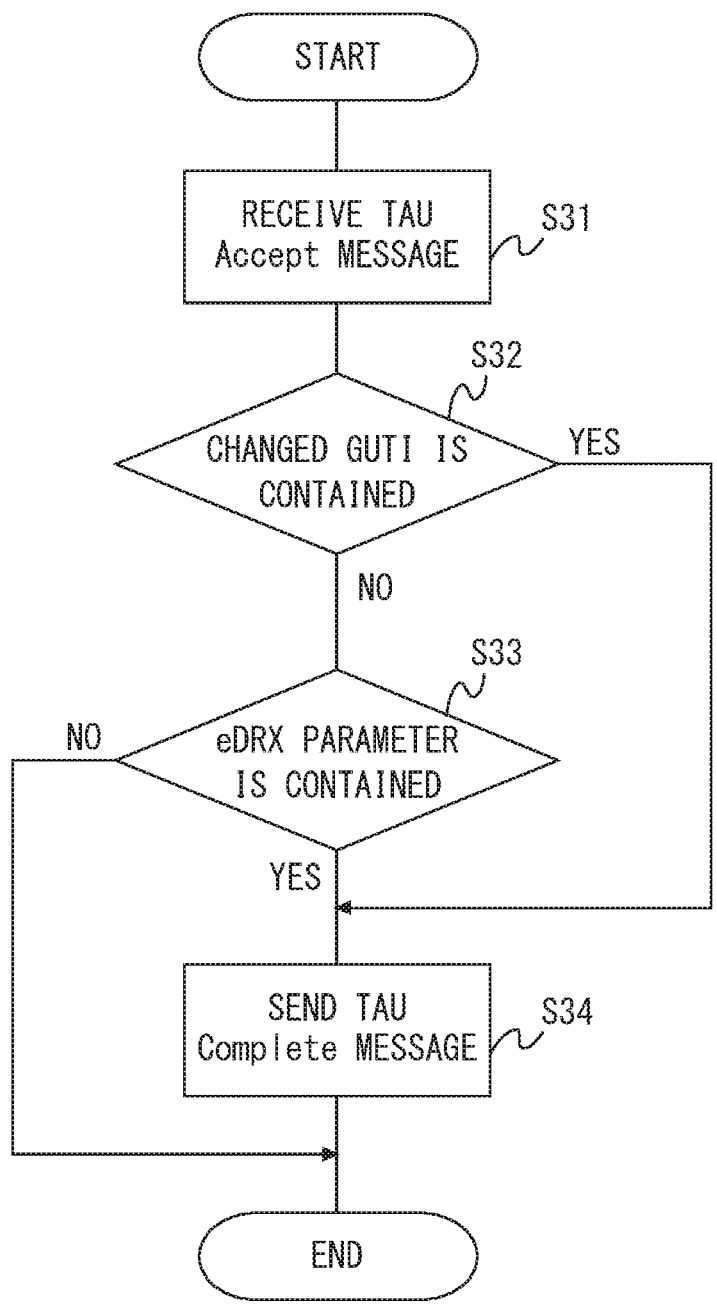
FIG. 7 is a view showing the flow of sending a TAU Complete message in an UE according to the second example embodiment.

Further, processing shown in FIG. 7, not FIG. 6, may be performed as the processing of sending the TAU Complete message in the UE 40. The processing of FIG. 7 is different from the processing of FIG. 6 in that the UE 40 determines whether the eDRX parameter is contained after determining whether the changed GUTI is contained in the received TAU Accept message.

To be specific, when the UE 40 receives the TAU Accept message from the MME 42 through the eNB 60 in Step S31, it determines whether the changed GUTI is contained in the TAU Accept message (S32). When the determination unit 12 determines that the changed GUTI is not contained in Step S32, it determines whether the eDRX parameter is contained in the received TAU Accept message (S33). When the determination unit 12 determines that the eDRX parameter is contained in Step S33, the sending unit 13 sends the TAU Complete message to the MME 42 through the eNB 60 (S34).

When, on the other hand, the determination unit 12 determines that the changed GUTI is contained in the received TAU Accept message in Step S32, the process proceeds to Step S34. At this time, the sending unit 13 sends the TAU Complete message to the MME 42 through the eNB 60.

When the determination unit 12 determines that the eDRX parameter is not contained in the received TAU Accept message in Step S33, the process ends.

Further, in Step S33 of FIG. 7, the determination unit 12 may determine whether the updated eDRX parameter is contained in the received TAU Accept message. The process may proceed to Step S34 when the determination unit 12 determines that the updated eDRX parameter is contained in Step S33 of FIG. 7, and the process may end when the determination unit 12 determines that the updated eDRX parameter is not contained.

Third Embodiment

Figure 8:
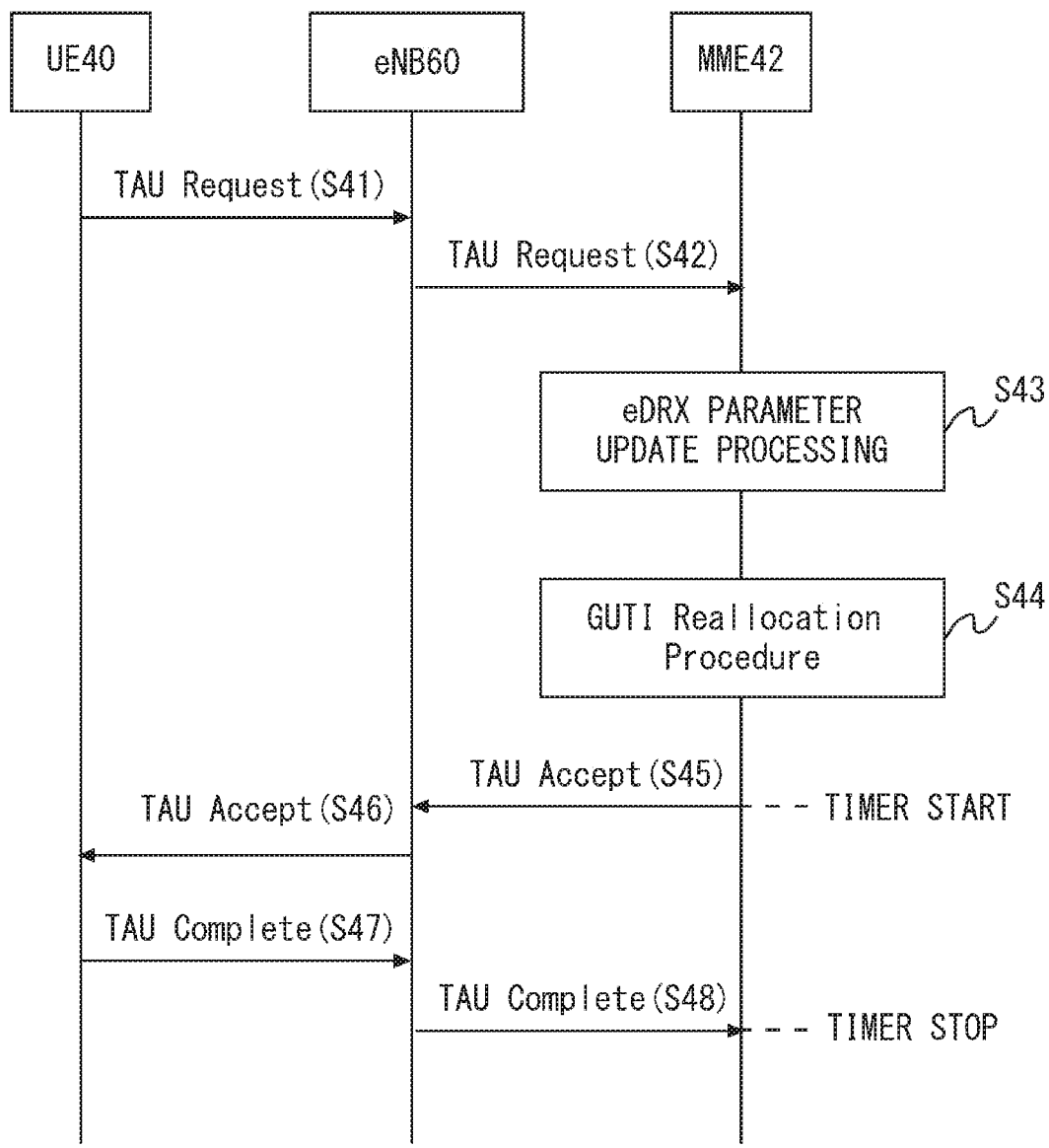
FIG. 8 is a view showing the flow of TAU processing according to a third example embodiment.

The flow of TAU processing according to a third example embodiment is described hereinafter with reference to FIG. 8. Steps S41 and S42 are the same as Steps S11 and S12 in FIG. 5, and the detailed description thereof is omitted.

When the MME 42 receives the TAU Request message containing the eDRX parameter, it may update the eDRX parameter contained in the TAU Request message (S43). Alternatively, assume a case where the eDRX parameter related to the UE 40 acquired from the HSS 43 is different from the eDRX parameter contained in the TAU Request message. In this case, the MME 42 may determine to update the eDRX parameter contained in the TAU Request message to the eDRX parameter acquired from the HSS 43. Alternatively, the MME 42 may update the eDRX parameter to a value previously determined in accordance with an operator policy. Further, when the MME 42 receives the TAU Request message containing the eDRX parameter, it performs GUTI Reallocation Procedure (S44). In the GUTI Reallocation Procedure, the MME 42 updates the GUTI (old GUTI) currently assigned to the UE 40 and generates a new GUTI. For example, the MME 42 updates M-TMSI contained in the old GUTI. The MME 42 may perform processing to update the eDRX parameter in Step S43 after performing the GUTI Reallocation Procedure in Step S44. On the other hand, the MME 42 may treat the GUTI (old GUTI) currently allocated to the UE 40 as a newly updated GUTI (new GUTI) without performing the GUTI Reallocation Procedure in Step S44.

Next, the MME 42 sends, to the eNB 60, the TAU Accept message to which the new GUTI or the GUTI (old GUTI) regarded as the new GUTI and the updated eDRX parameter are set (S45). At this time, the MME 42 starts the timer T3450 to monitor the receipt of the TAU Complete message within a predetermined period of time. After that, the eNB 60 transfers the received TAU Accept message to the UE 40 (S46).

Because the UE 40 has received the TAU Accept message containing the new GUTI, it sends the TAU Complete message to the eNB 60 (S47). The eNB 60 then transfers the TAU Complete message received in Step S47 to the MME 42 (S48). The MME 42 receives the TAU Complete message in Step S48 and thereby stops the timer started upon sending the TAU Accept message to the eNB 60. When the timer expires before receiving the TAU Complete message in Step S48, the MME 42 resends, to the eNB 60, the TAU Accept message to which the updated eDRX parameter is set.

Figure 9:
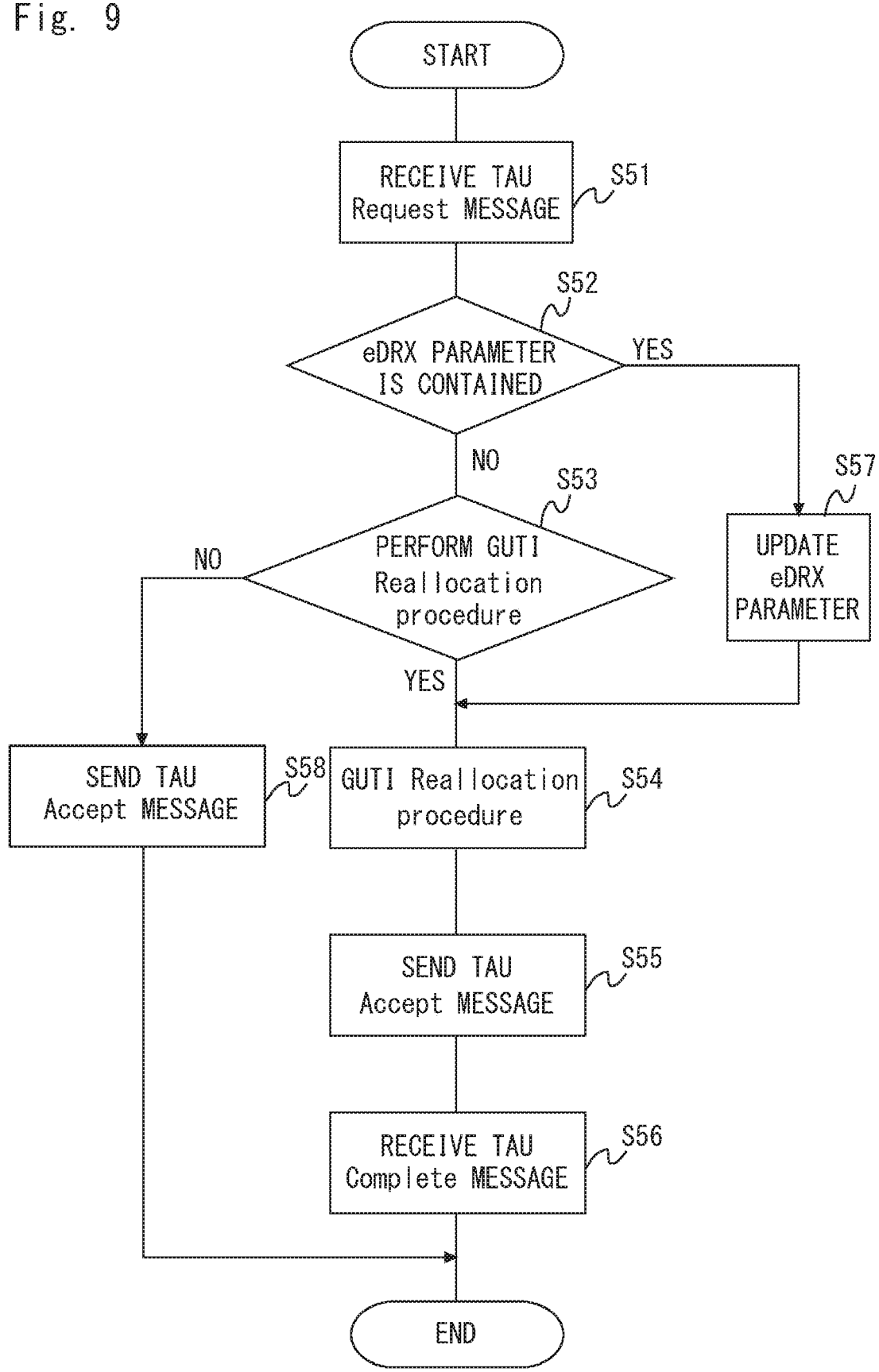
FIG. 9 is a view showing the flow of sending a TAU Accept message in an MME according to the third example embodiment.

The flow of sending the TAU Accept message in the MME 42 according to the third example embodiment is described hereinafter with reference to FIG. 9. First, the receiving unit 51 receives the TAU Request message from the UE 40 through the eNB 60 (S51).

Next, the control unit 52 determines whether the eDRX parameter is contained in the received TAU Request message (S52). When the control unit 52 determines that the eDRX parameter is not contained in the received TAU Request message, it determines whether to perform the GUTI Reallocation procedure (S53). The GUTI Reallocation procedure may be performed each time the TAU processing is performed, or may be performed when a specified period of time has elapsed from the previous GUTI Reallocation procedure.

When the control unit 52 determines to perform the GUTI Reallocation procedure, it performs the GUTI Reallocation procedure (S54). Then, the sending unit 53 sends the TAU Accept message to which the GUTI changed by performing the GUTI Reallocation procedure is set to the UE 40 through the eNB 60 (S55). The UE 40 receives the TAU Accept message containing the changed GUTI and then sends the TAU Complete message to the MME 42. Thus, the receiving unit 51 receives the TAU Complete message after the sending unit 53 sends the TAU Accept message (S56).

When the control unit 52 determines that the eDRX parameter is contained in the received TAU Request message in Step S52, it may update the eDRX parameter (S57). Alternatively, assume a case where the eDRX parameter related to the UE 40 acquired from the HSS 43 is different from the eDRX parameter contained in the TAU Request message. In this case, the control unit 52 may determine to update the eDRX parameter contained in the TAU Request message to the eDRX parameter acquired from the HSS 43. Alternatively, the control unit 52 may update the eDRX parameter to a value previously determined in accordance with an operator policy. It is assumed in this example that the control unit 52 updates the eDRX parameter each time receiving the TAU Request message containing the eDRX parameter. The process then proceeds to Step S54, and the control unit 52 performs the GUTI Reallocation procedure. When the eDRX parameter is updated in Step S57, the sending unit 53 sets the updated eDRX parameter as well as the changed GUTI to the TAU Accept message in Step S55.

When the control unit 52 determines not to perform the GUTI Reallocation procedure in Step S53, the sending unit 53 sends the TAU Accept message to which the GUTI is not set to the UE 40 through the eNB 60 (S58). When the UE 40 receives the TAU Accept message not containing the GUTI, it does not send the TAU Complete message to the MME 42. Therefore, the process ends after the sending unit 53 sends the TAU Accept message in Step S58.

As described above, the MME 42 according to the third example embodiment can perform the GUTI Reallocation procedure when it receives the TAU Request message containing the eDRX parameter. After performing the GUTI Reallocation procedure, the MME 42 sends the TAU Accept message to which the changed GUTI and the eDRX parameter are set to the UE 40. The UE 40 receives the TAU Accept message containing the changed GUTI and then sends the TAU Complete message to the MME 42. As a result, the MME 42 can recognize that the eDRX parameter has sent to the UE 40 by receiving the TAU Complete message.

The MME 42 can thereby determine the timing to perform Paging by using the same eDRX parameter as the eDRX parameter which the UE 40 has. It is thereby possible to allow the timing when the MME 42 performs Paging to coincide with the timing when the UE 40 monitors Paging. Further, although the TAU processing performed in the MME 42 is described in the third example embodiment, the Attach processing may be performed instead of the TAU processing. In this case, the TAU Request message is replaced with an Attach Request message. The TAU Accept message is replaced with an Attach Accept message. The TAU Complete message is replaced with an Attach Complete message. Alternatively, the SGSN 44 may be used instead of the MME 42, and RAU processing may be performed instead of the Attach processing to make Tracking Area Registration to a 3G network or the TAU processing. In the case of the RAU processing, the TAU Request message is replaced with a RAU Request message. The TAU Accept message is replaced with a RAU Accept message. The TAU Complete message is replaced with a RAU Complete message.

Configuration examples of the communication terminal 10 and the control device 30 described in the above-described plurality of example embodiments are described hereinafter.

Figure 10:
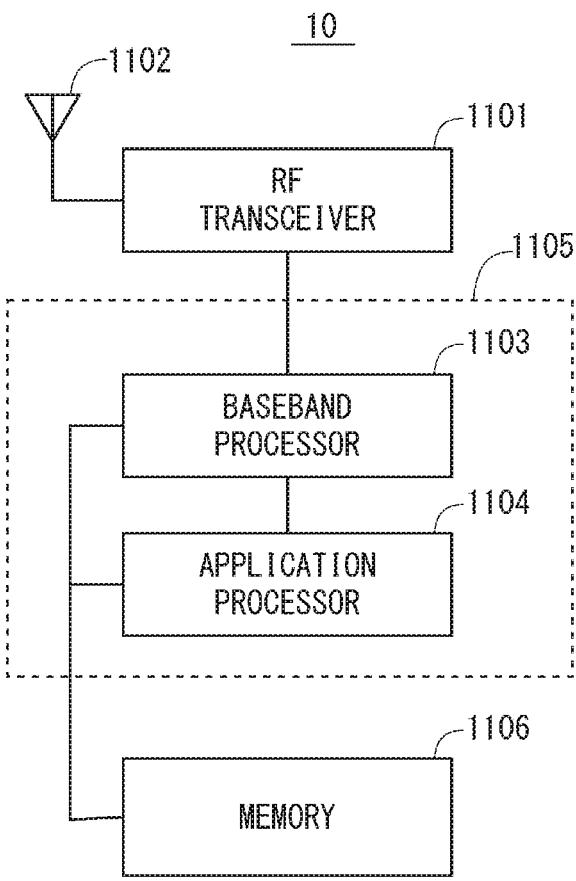
FIG. 10 is a block diagram of a communication terminal 10 according to each example embodiment.

FIG. 10 is a block diagram showing a configuration example of the communication terminal 10 (UE 40). A Radio Frequency (RF) transceiver 1101 performs analog RF signal processing for communication with the eNB 60. The analog RF signal processing performed by the RF transceiver 1101 includes frequency up-conversion, frequency down-conversion, and amplification. The RF transceiver 1101 is connected to an antenna 1102 and a baseband processor 1103. Specifically, the RF transceiver 1101 receives modulated symbol data (or Orthogonal Frequency Division Multiplexing (OFDM) symbol data) from the baseband processor 1103, generates a transmission RF signal and supplies the transmission RF signal to the antenna 1102. Further, the RF transceiver 1101 generates a baseband received signal based on a received RF signal received by the antenna 1102 and supplies it to the baseband processor 1103.

The baseband processor 1103 performs digital baseband signal processing (data plane processing) and control plane processing for radio communication. The digital baseband signal processing includes (a) data compression/decompression, (b) data segmentation/concatenation, (c) transmission format (transmission frame) composition/decomposition, (d) transmission path encoding/decoding, (e) modulation (symbol mapping)/demodulation, and (f) OFDM symbol data (baseband OFDM signal) generation by Inverse Fast Fourier Transform (IFFT) and the like. On the other hand, the control plane processing includes communication management of Layer 1, Layer 2 and Layer 3. The control plane processing of Layer 1 is transmission power control, for example. The control plane processing of Layer 2 is radio resource management and hybrid automatic repeat request (HARQ) processing, for example. The control plane processing of Layer 3 is attach, mobility, and signaling related to call management, for example.

For example, in the case of LTE and LTE-Advanced, the digital baseband signal processing by the baseband processor 1103 may include signal processing of Packet Data Convergence Protocol (PDCP) layer. Further, the digital baseband signal processing by the baseband processor 1103 may include signal processing of Radio Link Control (RLC) layer, MAC layer, and PHY layer. Further, the control plane processing by the baseband processor 1103 may include processing of Non-Access Stratum (NAS) protocol, RRC protocol, and MAC CE.

The baseband processor 1103 may include a modem processor that performs digital baseband signal processing and a protocol stack processor that performs control plane processing. The modem processor is a Digital Signal Processor (DSP), for example. The protocol stack processor is a Central Processing Unit (CPU) or Micro Processing Unit (MPU), for example. In this case, the protocol stack processor that performs control plane processing may be made common to an application processor 1104, which is described below.

The application processor 1104 is also called a CPU, an MPU, a microprocessor or a processor core. The application processor 1104 may include a plurality of processors (a plurality of processor cores). The application processor 1104 implements each function of the communication terminal 10 by running a system software program (Operating System (OS)) and various application programs (e.g., call application, web browser, mailer, camera control application, music playback application etc.) read from a memory 1106 or a memory which is not shown.

In some implementations, as shown in the dotted line (1105) in FIG. 10, the baseband processor 1103 and the application processor 1104 may be integrated into one chip. In other words, the baseband processor 1103 and the application processor 1104 may be implemented as one System on Chip (SoC) device 1105. The SoC device is also called a system Large Scale Integration (LSI) or a chip set in some cases.

The memory 1106 is a volatile memory, a nonvolatile memory, or a combination of them. The memory 1106 may include a plurality of memory devices that are physically independent of one another. The volatile memory is a Static Random Access Memory (SRAM), a Dynamic RAM (DRAM), or a combination of them, for example. The nonvolatile memory is a mask Read Only Memory (MROM), an Electrically Erasable Programmable ROM (EEPROM), a flash memory, a hard disk drive, or a combination of them, for example. For example, the memory 1106 may include an external memory device that is accessible from the baseband processor 1103, the application processor 1104 and the SoC 1105. The memory 1106 may include an internal memory device that is integrated into the baseband processor 1103, the application processor 1104 or the SoC 1105. Further, the memory 1106 may include a memory in a Universal Integrated Circuit Card (UICC).

The memory 1106 may store a software module (computer program) containing a group of instructions and data for performing the processing by the communication terminal 10 described in the above plurality of example embodiments. In some implementations, the baseband processor 1103 or the application processor 1104 may be configured to perform the processing of the communication terminal 10 described in the above example embodiments by reading the software module from the memory 1106 and executing it.

Figure 11:
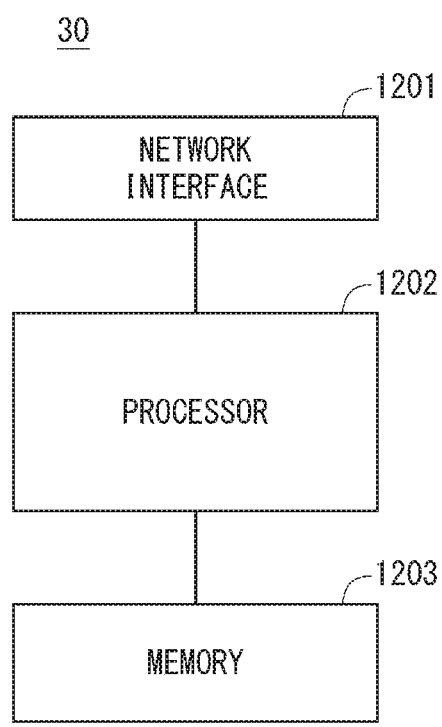
FIG. 11 is a block diagram of a control device 30 according to each example embodiment.

FIG. 11 is a block diagram showing a configuration example of the control device 30 (the MME 42 or the SGSN 44). Referring to FIG. 11, the MME 42 or the SGSN 44 includes a network interface 1201, a processor 1202, and a memory 1203. The network interface 1201 is used to communicate with network nodes (e.g., the eNB 60, the HSS 43 etc.). The network interface 1201 may include a network interface card (NIC) that complies with the Insititute of Electrical and Electronics Engineers (IEEE) 802.3 series, for example.

The processor 1202 reads and runs software (computer program) from the memory 1203 and thereby executes processing of the control device 30 that is described with reference to the sequence charts and the flowcharts in the example embodiments described above. The processor 1202 may be a microprocessor, an MPU or a CPU, for example. The processor 1202 may include a plurality of processors.

The memory 1203 is a combination of a volatile memory and a nonvolatile memory. The memory 1203 may include a storage that is placed apart from the processor 1202. In this case, the processor 1202 may access the memory 1203 through an I/O interface, which is not shown.

In the example of FIG. 11, the memory 1203 is used to store a group of software modules. The processor 1202 reads and runs the group of software modules from the memory 1203 and can thereby perform the processing of the MME 42 or the SGSN 44 described in the above example embodiments.

As described with reference to FIGS. 10 and 11, each of processors included in the UE 40 and the MME 42 or the SGSN 44 in the above example embodiments runs one or a plurality of programs including a group of instructions for causing a computer to perform the algorithms described using the drawings. This program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, DVD-ROM (Digital Versatile Disc Read Only Memory), DVD-R (DVD Recordable)), DVD-R DL (DVD-R Dual Layer)), DVD-RW (DVD ReWritable)), DVD-RAM), DVD+R), DVR+R DL), DVD+RW), BD-R (Blu-ray (registered trademark) Disc Recordable)), BD-RE (Blu-ray (registered trademark) Disc Rewritable)), BD-ROM), and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

It should be noted that the present invention is not limited to the above-described example embodiments and may be varied in many ways within the scope of the present invention. Further, in this disclosure, example embodiments can be combined as appropriate.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-255879 filed on Dec. 28, 2016, the disclosure of which is incorporated herein in its entirety by reference.

Further, the whole or part of the example embodiments disclosed above can be described as, but not limited to, the following supplementary notes.

Supplementary Note 1

A communication terminal comprising:

a receiving unit configured to receive a Tracking Area Registration Accept message or a Location Registration Accept message sent from a control device; and a sending unit configured to send a Tracking Area Registration Complete message or a Location Registration Complete message to the control device when a first eDRX (Extended Idle Mode DRX) parameter is contained in the Tracking Area Registration Accept message or the Location Registration Accept message.

Supplementary Note 2

The communication terminal according to Supplementary Note 1, wherein the sending unit sends a Tracking Area Registration Request message or a Location Registration Request message containing a second eDRX parameter upon starting Tracking Area Registration processing or Location Registration processing, and the first eDRX parameter is the same eDRX parameter as the second eDRX parameter or an eDRX parameter after update of the second eDRX parameter in the control device.

Supplementary Note 3

The communication terminal according to Supplementary Note 2, wherein when the first eDRX parameter is the same as the second eDRX parameter, the sending unit refrains from sending the Tracking Area Registration Complete message or the Location Registration Complete message.

Supplementary Note 4

The communication terminal according to any one of Supplementary Notes 1 to 3, wherein when at least one of the first eDRX parameter and a temporary identity assigned to the communication terminal and changed is contained in the Tracking Area Registration Accept message or the Location Registration Accept message, the sending unit sends the Tracking Area Registration Complete message or the Location Registration Complete message to the control device.

Supplementary Note 5

The communication terminal according to Supplementary Note 4, wherein when the changed temporary identity is not contained and the first eDRX parameter is contained in the Tracking Area Registration Accept message or the Location Registration Accept message, the sending unit sends the Tracking Area Registration Complete message or the Location Registration Complete message to the control device.

Supplementary Note 6

The communication terminal according to any one of Supplementary Notes 1 to 5, wherein the Tracking Area Registration is Attach, and the Location Registration is TAU (Tracking Area Update) or RAU (Routing Area Update).

Supplementary Note 7

A communication terminal comprising:

a sending unit configured to send a Tracking Area Registration Request message or a Location Registration Request message containing an eDRX (Extended Idle Mode DRX) parameter to a control device; and a receiving unit configured to update a temporary identity temporarily assigned to the communication terminal in response to receipt of the eDRX parameter by the control device, and receive a Tracking Area Registration Accept message or a Location Registration Accept message containing the temporary identity updated in the control device, wherein when the Tracking Area Registration Accept message or the Location Registration Accept message containing the temporary identity is received, the sending unit sends a Tracking Area Registration Complete message or a Location Registration Complete message to the control device.

Supplementary Note 8

The communication terminal according to Supplementary Note 7, wherein the receiving unit receives the Tracking Area Registration Accept message or the Location Registration Accept message containing the eDRX parameter updated and the temporary identity updated in response to receipt of the eDRX parameter by the control device.

Supplementary Note 9

A control device comprising:

a sending unit configured to send a Tracking Area Registration Accept message or a Location Registration Accept message containing a first eDRX (Extended Idle Mode DRX) parameter to a communication terminal; and a receiving unit configured to receive a Tracking Area Registration Complete message or a Location Registration Complete message sent from the communication terminal in response to receipt of the first eDRX parameter by the communication terminal.

Supplementary Note 10

The control device according to Supplementary Note 9, wherein the receiving unit receives a Tracking Area Registration Request message or a Location Registration Request message containing a second eDRX parameter from the communication terminal requesting Tracking Area Registration processing or Location Registration processing, and the sending unit sends a Tracking Area Registration Accept message or a Location Registration Accept message containing the first eDRX parameter having the same value as the second eDRX parameter to the communication terminal, or sends a Tracking Area Registration Accept message or a Location Registration Accept message containing the first eDRX parameter having a value after update of the second eDRX parameter to the communication terminal.

Supplementary Note 11

The control device according to Supplementary Note 10, wherein the first eDRX parameter having a value after update of the second eDRX parameter is a value sent from a subscriber information management device.

Supplementary Note 12

A control device comprising:

a receiving unit configured to receive a Tracking Area Registration Request message or a Location Registration Request message sent from a communication terminal requesting Tracking Area Registration processing or Location Registration processing;

a control unit configured to perform processing to update a temporary identity assigned to the communication terminal when an eDRX (Extended Idle Mode DRX) parameter is contained in the Tracking Area Registration Request message or the Location Registration Request message; and a sending unit configured to send a Tracking Area Registration Accept message or a Location Registration Accept message containing the eDRX parameter or an eDRX parameter after update and the temporary identity after update to the communication terminal.

Supplementary Note 13

The control device according to Supplementary Note 12, wherein the control unit updates the eDRX parameter when an eDRX parameter is contained in the Tracking Area Registration Request message or the Location Registration Request message.

Supplementary Note 14

The control device according to Supplementary Note 12, wherein the eDRX parameter after update is a value sent from a subscriber information management device.

Supplementary Note 15

A control device comprising:

a control unit configured to perform processing to update an eDRX (Extended Idle Mode DRX) parameter and update a temporary identity assigned to a communication terminal; and a sending unit configured to send a Tracking Area Registration Accept message or a Location Registration Accept message containing the eDRX parameter after update and the temporary identity after update to the communication terminal.

Supplementary Note 16

A communication system comprising:

a communication terminal including a receiving unit configured to receive a Tracking Area Registration Accept message or a Location Registration Accept message sent from a control device, and a sending unit configured to send a Tracking Area Registration Complete message or a Location Registration Complete message to the control device when a first eDRX (Extended Idle Mode DRX) parameter is contained in the Tracking Area Registration Accept message or the Location Registration Accept message; and a control device including a sending unit configured to send the Tracking Area Registration Accept message or the Location Registration Accept message containing the first eDRX parameter to the communication terminal, and a receiving unit configured to receive the Tracking Area Registration Complete message or the Location Registration Complete message sent from the communication terminal in response to receipt of the first eDRX parameter by the communication terminal.

Supplementary Note 17

A communication method in a communication terminal comprising:

receiving a Tracking Area Registration Accept message or a Location Registration Accept message sent from a control device; and sending a Tracking Area Registration Complete message or a Location Registration Complete message to the control device when a first eDRX (Extended Idle Mode DRX) parameter is contained in the Tracking Area Registration Accept message or the Location Registration Accept message.

Supplementary Note 18

A communication method in a communication terminal comprising:

sending a Tracking Area Registration Request message or a Location Registration Request message containing an eDRX (Extended Idle Mode DRX) parameter to a control device;

updating a temporary identity temporarily assigned to the communication terminal in response to receipt of the eDRX parameter by the control device;

receiving a Tracking Area Registration Accept message or a Location Registration Accept message containing the temporary identity updated in the control device; and sending a Tracking Area Registration Complete message or a Location Registration Complete message to the control device.

Supplementary Note 19

A communication method in a control device comprising:

sending a Tracking Area Registration Accept message or a Location Registration Accept message containing a first eDRX (Extended Idle Mode DRX) parameter to a communication terminal; and receiving a Tracking Area Registration Complete message or a Location Registration Complete message sent from the communication terminal in response to receipt of the first eDRX parameter by the communication terminal.

Supplementary Note 20

A communication method in a control device comprising:

receiving a Tracking Area Registration Request message or a Location Registration Request message sent from a communication terminal requesting Tracking Area Registration processing or Location Registration processing;

performing processing to update a temporary identity assigned to the communication terminal when an eDRX (Extended Idle Mode DRX) parameter is contained in the Tracking Area Registration Request message or the Location Registration Request message; and sending a Tracking Area Registration Accept message or a Location Registration Accept message containing the eDRX parameter or an eDRX parameter after update and the temporary identity after update to the communication terminal.

REFERENCE SIGNS LIST

10 COMMUNICATION TERMINAL
11 RECEIVING UNIT
12 DETERMINATION UNIT
13 SENDING UNIT
20 BASE STATION
30 CONTROL DEVICE
40 UE
41 E-UTRAN
42 MME
43 HSS
44 SGSN
45 SGW
46 PGW
47 PCRF
48 UTRAN
49 GERAN
50 OPERATOR'S IP SERVICES
51 RECEIVING UNIT
52 CONTROL UNIT
53 SENDING UNIT
60 eNB

The invention claimed is:

1. A terminal comprising:
at least one memory storing instructions, and
at least one processor configured to execute the instructions to:
send, to a control device in a network, a Registration Request message including a first eDRX (Extended Idle Mode DRX) parameter;
receive, from the control device, a Registration Accept message including a new GUTI (Globally Unique Temporary UE Identity) assigned for the terminal and a second eDRX parameter, which is different from the first eDRX parameter if the second eDRX parameter is provided from a server in the network to the control device; and
send a Complete message to the control device,
wherein the new GUTI is assigned based on updating the first eDRX parameter to the second eDRX parameter.

2. The terminal according to claim 1, wherein
the Registration Request message is a TAU (Tracking Area Update) Request message, and
the Registration Accept message is a TAU Accept message.

3. A control device in a network having a terminal (UE (User Equipment)), the control device comprising:
a memory; and
at least one processor, comprising hardware, configured to:
receive, from the UE, a Registration Request message including a first eDRX (Extended Idle Mode DRX) parameter;

update the first eDRX parameter to a second eDRX parameter which is different from the first eDRX parameter if a server in the network provides the second eDRX parameter to the control device;

assign a new GUTI (Globally Unique Temporary UE Identity) for the UE; and send, to the UE, a Registration Accept message including the new GUTI and the second eDRX, wherein the new GUTI is assigned based on updating the first eDRX parameter to the second eDRX parameter.

4. A communication method performed by a control device in a network having a UE (User Equipment), the method comprising:

receiving, from the UE, a Registration Request message including a first eDRX (Extended Idle Mode DRX) parameter;

updating the first eDRX parameter to a second eDRX parameter which is different from the first eDRX parameter if a server in the network provides the second eDRX parameter to the control device;

assigning a new GUTI (Globally Unique Temporary UE Identity) for the UE; and sending, to the UE, a Registration Accept message including the new GUTI and the second eDRX, wherein the new GUTI is assigned based on updating the first eDRX parameter to the second eDRX parameter.

5. The control device according to claim 3, wherein the Registration Request message is a TAU (Tracking Area Update) Request message, and the Registration Accept message is a TAU Accept message.

6. The control device according to claim 5, wherein the control device is an MME (Mobility Management Entity), and the server is an HSS (Home Subscriber Server).

7. The control device according to claim 3, wherein the at least one processor is configured to use the second eDRX parameter with the new GUTI until the control device receives, from the UE, a Complete message while a timer T3450 runs.

8. The control device according to claim 7, wherein the Complete message is a TAU (Tracking Area Update) Complete message.

9. The control device according to claim 7, wherein the timer T3450 is operable to be started when the Registration Accept message is sent to the UE.

10. The method according to claim 4, wherein the Registration Request message is a TAU (Tracking Area Update) Request message, and the Registration Accept message is a TAU Accept message.

11. The method according to claim 10, wherein the control device is an MME (Mobility Management Entity), and the server is an HSS (Home Subscriber Server).

12. The method according to claim 4 further comprising:

using the second eDRX parameter with the new GUTI until the control device receives, from the UE, a Complete message while a timer T3450 runs.

13. The method according to claim 12, wherein the Complete message is a TAU (Tracking Area Update) Complete message.

14. The method according to claim 12, wherein the timer T3450 is operable to be started when the Registration Accept message is sent to the UE.

15. The control device according to claim 3, wherein the at least one processor is configured to receive, from the UE, a Complete message in response to the Registration Accept message.

16. The control device according to claim 3, wherein the control device is an AMF (Access and Mobility management Function).

17. The method according to claim 4, wherein the control device is an AMF (Access and Mobility management Function).

* * * * *